J. O. ELLINGER.
METALLIC COLUMN, &c.
APPLICATION FILED OCT. 4, 1911.
1,141,385.
Patented June 1, 1915.
3 SHEETS—SHEET 1.
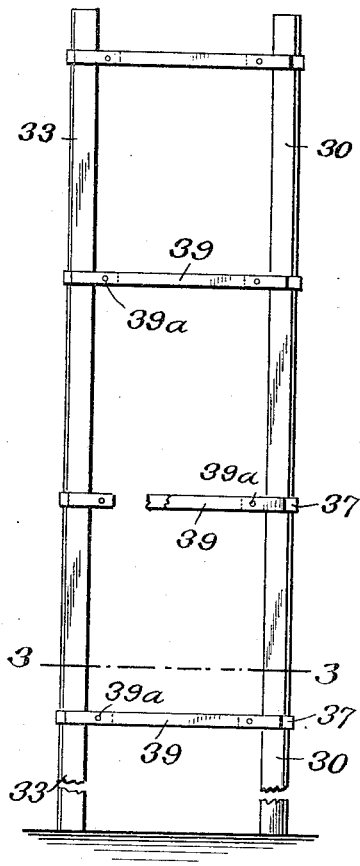
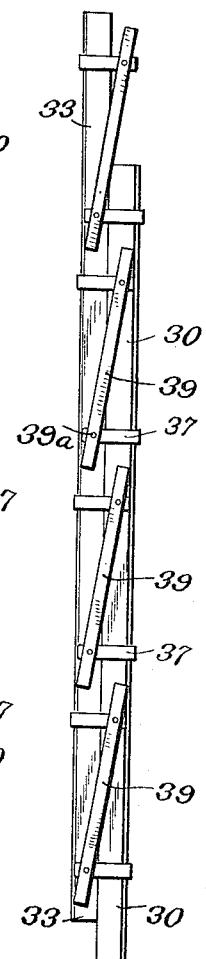
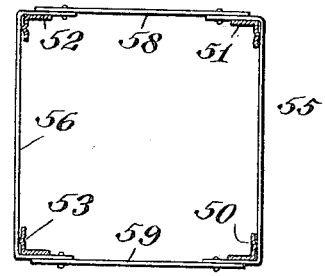
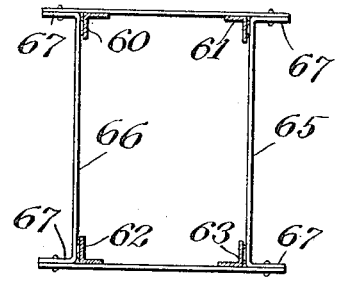
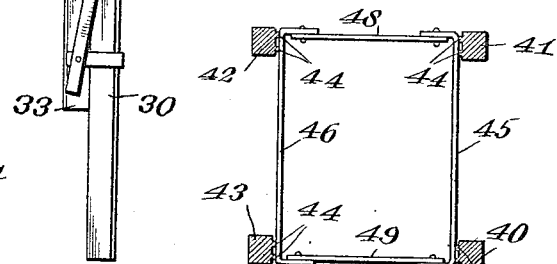
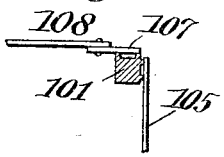
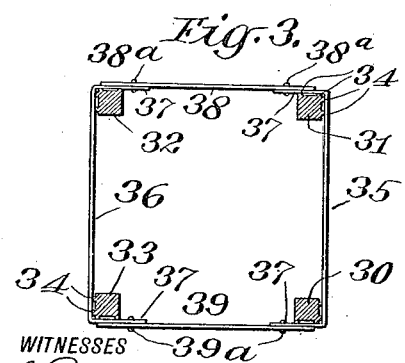
THE NORRIS PETERS CO., PHOTO-LITHO., WASHINGTON, D. C.

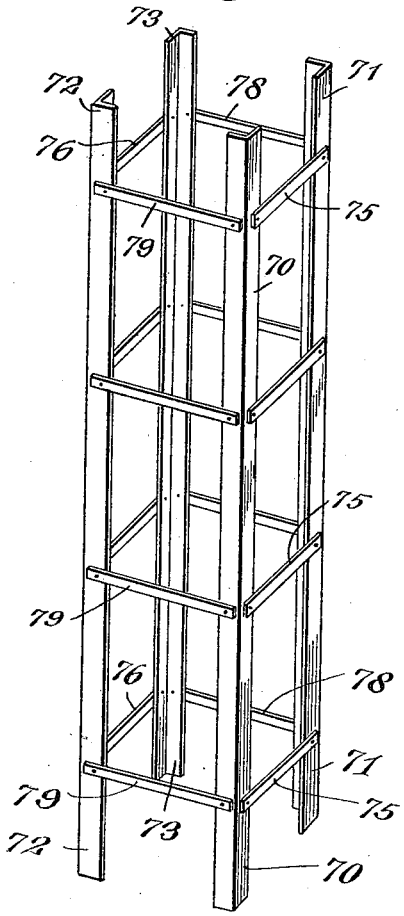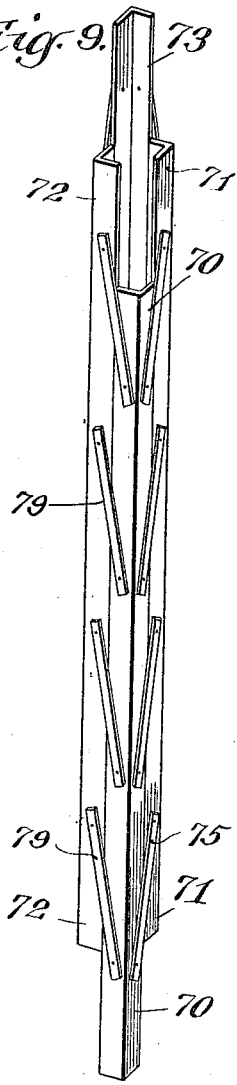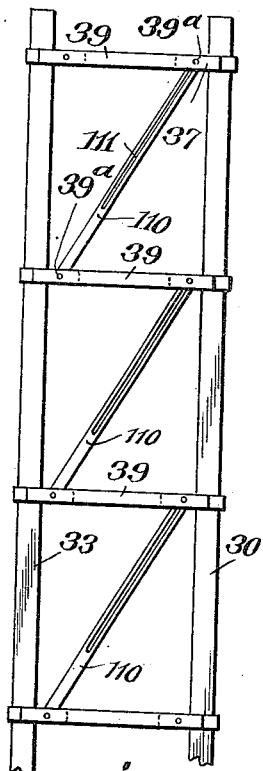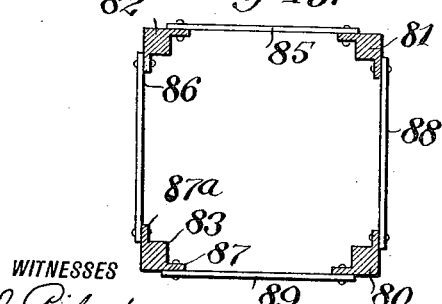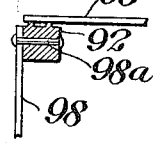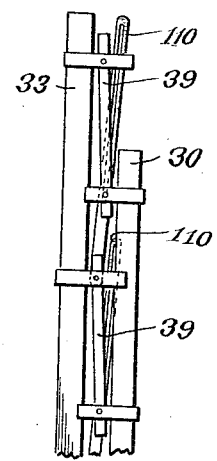

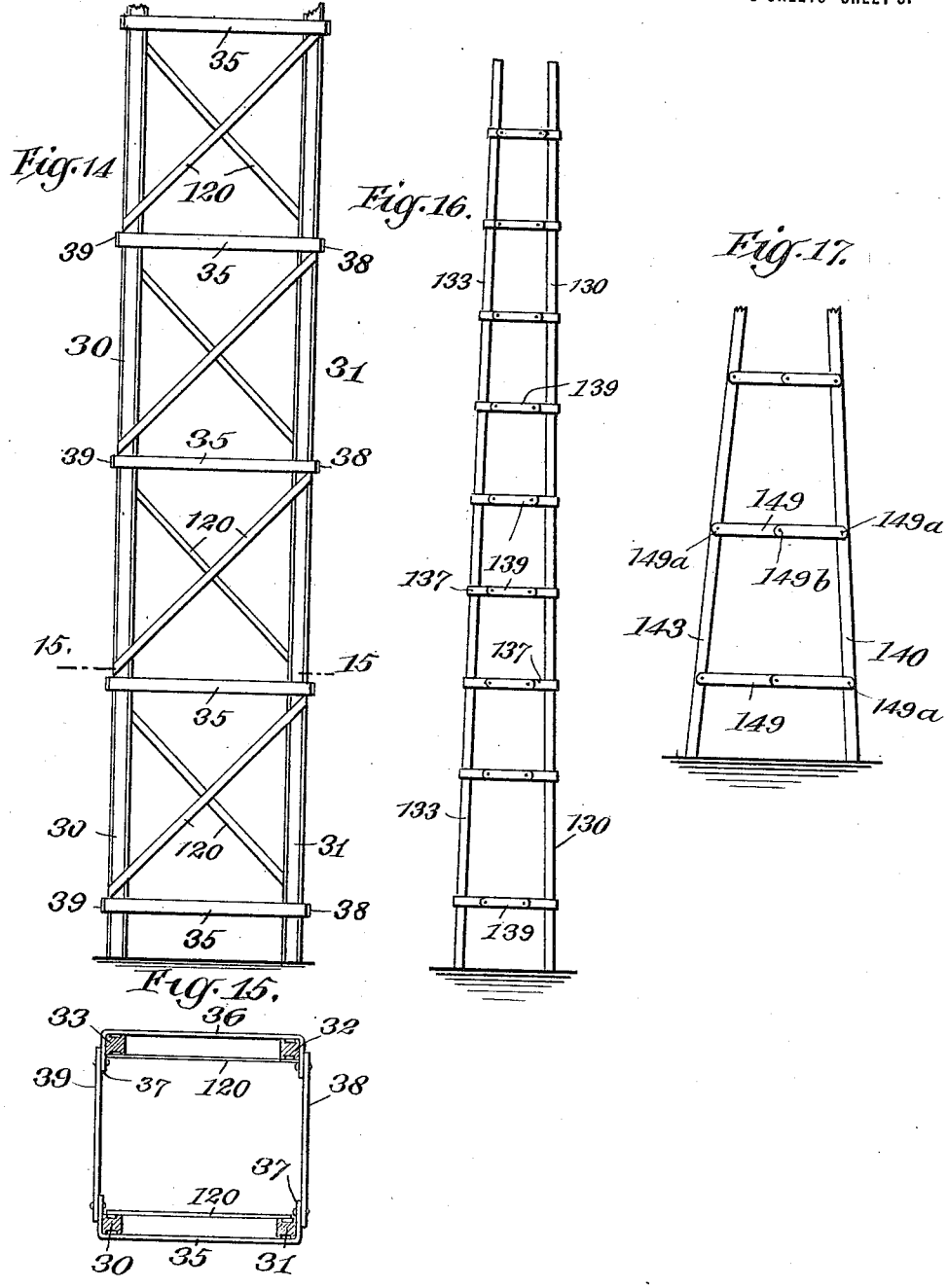

UNITED STATES PATENT OFFICE.

JULIAN O. ELLINGER, OF NEW YORK, N. Y.

METALLIC COLUMN, &c.

1,141,385.  Specification of Letters Patent.  Patented June 1, 1915.

Application filed October 4, 1911. Serial No. 652,698.

*To all whom it may concern:*

Be it known that I, JULIAN O. ELLINGER, a citizen of the United States, and a resident of the city, county, and State of New York, have invented certain new and useful Improvements in Metallic Columns, &c., of which the following is a specification.

This invention relates to skeleton structures fabricated of metal bars, straps, angles, and the like, adapted to be used as columns, poles, towers, beams, girders, and concrete reinforcements, for example, and it consists in the novel features shown in the drawings and described in the following specification.

The principal object of the present invention is to provide a skeleton metallic structure composed of a series of longitudinal members arranged in an angular relation having links connecting the same in such manner that the structure may be stored and transported in collapsed condition and readily opened to its expanded condition for use.

Others of the important objects of the invention are connected with various most highly desirable and advantageous forms and correlations of the parts of structures of the kinds hereinbefore referred to, and will hereinafter fully appear.

The several objects of the invention are subserved by the constructions illustrated in the accompanying drawings and described in the following specification typifying various forms of structure and construction of parts thereof, within the spirit of the invention and the scope of the subjoined claims. It is to be understood, however, that other forms and constructions than those herein typified may be employed without departing from the spirit of the invention or the scope of the claims.

In the drawings:—Figure 1 is a longitudinal view, which may be either an elevation or plan, according to whether the structure is to be employed in upright or in horizontal position, of one highly desirable form of collapsible skeleton structure made in accordance with the present invention, showing the same expanded for use. Fig. 2 is a like view of the same construction, collapsed for storage or transportation. Fig. 3 is a transverse section on the line 3—3 of Fig. 1. Fig. 4 is a transverse section through a structure similar to that of the preceding figures, but typifying a different form of longitudinal bars which may be employed. Fig. 5 is also a transverse section typifying a different relative disposition of members from what has been shown in the preceding figures. Fig. 6 similarly is a transverse section typifying a further changed relative disposition of parts. Fig. 7 is a detail view exemplifying a slightly changed construction of transverse members. Fig. 8 is a perspective view of a structure which exemplifies the practicability of linking all of a series of longitudinal members of an angular structure together, showing the structure expanded for use. Fig. 9 is a similar view of the same structure collapsed. Fig. 10 is a transverse section of another structure all of whose longitudinal members are linked together. Fig. 11 is a detail view illustrative of a simple form of the invention. Fig. 12 is an elevation or plan view exemplifying the practicability of the use of diagonal bracing members, showing a form of the device embodying such members as being connected to the linked-together longitudinal members. Fig. 13 is a similar view of the same structure collapsed. Fig. 14 is an elevation or plan view showing the use of crossed diagonal braces between rigidly-connected longitudinal members. Fig. 15 is a transverse section on the line 15—15 of Fig. 14. Fig. 16 is an elevation or plan view exemplary of a tapered form of the structure. Fig. 17 is a similar view illustrative of another form of tapered structure.

Similar characters of reference denote corresponding parts in the several views.

In general terms it may be stated that a structure considered to be within the spirit of the present invention is hollow and of skeleton formation. It may be rectangular or of other suitable polygonal shape in cross section. It must comprise a series of suitable longitudinal members which are arranged in an angular relation and some or all of these members must be connected together by pivoted links which are suitably arranged to permit the structure to be collapsed for storage or transportation and readily opened out for use. Within these limits, the invention may be variously embodied. It is not considered to be either necessary or expedient to illustrate and describe, in detail, all of the different embodiments which are considered to be within the spirit of the invention, but a number of different embodiments are illustrated, and these will readily suggest other detail forms and arrangements and correlations of parts to those skilled in the art to which the present invention appertains.

Referring now particularly to the embodiment illustrated in Figs. 1, 2 and 3, the longitudinal members of the structure are respectively marked 30, 31, 32 and 33. These members are arranged in an angular relation which is such that they form, or are disposed at, the corners of a structure which is rectangular in cross section. Each is a bar rolled substantially square in cross section and with two of its sides which are at an angle to each other provided with longitudinal welding projections marked 34. These longitudinal bars are rigidly secured together in pairs by straps marked 35 and 36. A series of the straps 35 are shown as securing the bars 30 and 31 together and a like series of the straps 36 are shown as connecting the bars 32 and 33 together. The straps 35 and 36 are arranged in a spaced relation along the length of the bars and each has its ends turned inwardly to form flanges 37 and is electrically welded to the contiguous bars at the ribs 34, the straps extending around the ribbed surfaces of the bars and being arranged outside the latter, as shown. Their flanges 37 also extend toward each other beyond the planes of the surfaces of the bars and to these extensions opposite ends of links 38 and 39 are pivoted by the pivots 38ª, 38ª and 39ª, 39ª as shown. These links thus serve to connect the side of the structure which is composed of the bars 30 and 31 and straps 35, with the side composed of the bars 32 and 33 and straps 36 and they coöperate with the bars 30 and 33 to form a third side of the structure and with the bars 31 and 32 to form the fourth side of the structure. They obviously permit the side composed of the bars 30 and 31 and straps 35 and the side composed of the bars 32, 33 and straps 36 to be moved into contact with each other, whereby the structure is collapsed into the form shown in Fig. 2, and similarly permit said sides to be moved away from each other and the structure thereby correspondingly expanded to the form shown in Fig. 1, for use.

In the form of the invention thus far particularly described, the straps and links are arranged outside the planes of the bars, but if desired the bars may be outside the straps as illustrated in Fig. 6, in which 40, 41, 42 and 43 inclusive designate the longitudinal bars; 45 and 46 designate the straps which rigidly connect the bars together by being electrically welded thereto and 48 and 49 designate the links. In this form it is necessary to form one side only of each longitudinal bar with welding ribs or other suitable projections, which are marked 44 in this figure. Other forms of longitudinal members may be employed, the invention contemplating the use of any suitable form thereof. For example, in Fig. 4, angle bars marked 50, 51, 52 and 53 are shown. These bars are shown in this figure as being employed with straps, 55 and 56, and links 58 and 59 identical in structure and arrangement with the corresponding members of the form shown in Figs. 1, 2 and 3.

In all of the preceding forms of the invention, the relative disposition of the straps is such that the flanges of the straps on one side of the structure extend toward the flanges of the straps on the other side; but, if desired, the straps may be so disposed that their flanges will extend outward. This is exemplified in Fig. 5, in which 65 and 66 designate the straps having flanges 67. While in this particular exemplification longitudinal bars, marked 60, 61, 62 and 63 of angle form are shown, it is apparent that the same relative disposition of the parts may be employed with bars of other suitable shape, and it is also evident that the bars may by prolonging the flanges of the straps be arranged in the corners of the latter, that is to say, outside of the plane of the portion of the straps which extend from one bar to another.

In all of the preceding exemplifications of the invention, the members of each of two sides of the structure are rigidly connected together; but if desired all four longitudinal members may be connected with each other by links. This is exemplified in Figs. 8 and 9 in which 70, 71, 72 and 73 designate the longitudinal members and 75, 76, 78 and 79 designate the links, of which links there is a series on each of the four sides of the structure. The longitudinal members in this particular exemplification are angle bars, but this, while it is an advantageous form may be varied without departing from the spirit of the invention.

In Fig. 10 there is exemplified another collapsible rectangular structure whose longitudinal members are all linked together, that is to say on each of the four sides of the structure. This figure also exemplifies a peculiar longitudinal bar which may be used in this and other forms of the invention 80, 81, 82 and 83 designate the longitudinal bar, each having a solid body and flanges 87 and 87ª, the flanges being arranged at an angle with each other and serving as the means to which the ends of the connecting transverse members 85, 86, 88 and 89 are attached, said transverse members being each shown as a link, although obviously some of them may be rigidly secured to the flanges if desired, in which event they serve as substitutes for the flanges of the straps hereinbefore particularly described.

A form of structure in which there are no flanges on either the transverse or longitudinal members is indicated in Fig. 11, in which it will be noted that a link 98 is shown as secured at its end by a pivot bolt marked 98ª to a longitudinal member, marked 92. This particular exemplification shows a strap marked 95 welded to the longitudinal member 92, but obviously another link may be used in lieu of said strap. Again, with reference to the flanges referred to, a substitute for flanges integral with either the longitudinal or transverse members is indicated in Fig. 7, in which a short plate marked 107 is shown welded to a side of the longitudinal member, marked 101, the parts 105 and 108 in this particularly being a strap and a link respectively.

If desired, suitable diagonal braces may be employed. Figs. 12 and 13 exemplify the use of diagonal braces between linked members of the structure, while Figs. 14 and 15 exemplify the use of diagonal braces for rigidly connected longitudinal members. In the particular exemplification illustrated in Figs. 12 and 13, the structure except as to the diagonal braces is similar to those shown in Figs. 1, 2, 3 and 4 for example and need not be more particularly described. The diagonal braces are marked 110 and each is pivoted, as at 39ª, to a flange 37 projecting from the longitudinal member 33 while its other end is slidably connected, to a flange 37 of the opposite longitudinal member 30. The slidable connection is preferably provided for by slotting the brace, longitudinally, as shown at 111. The flanges referred to may be integral either with the straps or with the longitudinal members, or separate plates, all of which forms have been hereinbefore referred to. The links seen in this figure are marked 39, and the points 39 are the pivots which connect said links to the flanges.

In the exemplification shown in Figs. 14 and 15 diagonal braces marked 120 are rigidly secured to the rigidly connected longitudinal members 30 and 31 of the structure. The parts marked 35 and 36 are the rigid connecting straps and the parts marked 38 and 39 are the links. While this figure shows crossed diagonal braces, this is not essential, as is obvious.

In each of the preceding forms of the structures the cross-sectional areas are the same throughout the length of the structure, but, if desired the structure may be tapered, or of varying cross-sectional areas. This is exemplified in Figs. 16 and 17, in the former of which links marked 139 are pivoted at each end to flanges marked 137 projecting from the longitudinal members 130 and 133 for example. It will be noted that in this particular exemplification the pivot points at corresponding ends of the links are alined vertically or longitudinally of the structure the links being shown as continuous from one flange to another and the flanges being shown as of varying lengths; while in Fig. 17 the links marked 149 are shown as being jointed at 149ᵇ and as having their outer ends pivoted, at 149ª, to the longitudinal members 140 and 143, and as being of varying lengths with the joints 149 alined longitudinally of the structure. In both of these exemplifications the longitudinal members are inclined toward each other from one end of the structure.

Having now described the invention what I believe to be new and desire to secure by Letters Patent, is:—

1. A collapsible metallic building structure comprising a series of spaced longitudinal members arranged in an angular relation, transverse elements arranged on opposite sides of the structure and rigidly secured to the longitudinal elements and having bent ends, and other transverse elements arranged on the other and opposite sides of the structure and having their ends pivotally connected to the bent ends of the first mentioned transverse elements.

2. A collapsible skeleton metallic building structure comprising a series of spaced longitudinal members arranged in an angular relation, transverse straps connecting by welds the longitudinal members together in pairs, and links arranged at an angle with the straps and connecting the pairs of longitudinal members with each other, and having their ends pivoted to projections from the straps.

3. A collapsible skeleton metallic structure, certain of whose opposite sides are each formed of longitudinal members and transverse members rigidly secured thereto to connect the same together, said transverse members having ends bent to extend around the longitudinal members, the flanges on one side of the structure extending toward the flanges on the other side thereof, and links pivoted to said flanges to permit the two sides to be folded toward each other.

4. A collapsible skeleton metallic structure, comprising a series of longitudinal members arranged in an angular relation and transverse members spaced along the lengths of the longitudinal members and connecting the same with each other, the transverse members comprising links and straps arranged on different sides of the structure, at an angle to each other, the straps being rigidly secured to the longitudinal members and having flanged ends, and the links being pivoted to said ends, and diagonal braces arranged on the sides containing the links, each of said braces being pivoted at one end to one of said flanged ends of a strap and having slidable connection at the other end with another flanged end of a strap.

In witness whereof I have hereunto set my hand at the city, county and State of New York, this 3d day of October, 1911.

JULIAN O. ELLINGER.

In presence of—
ISABEL R. RICHARDS,
AGNES C. O'CONNELL.

Copies of this patent may be obtained for five cents each, by addressing the "Commissioner of Patents, Washington, D. C."